United States Patent [19]

Ayers

[11] Patent Number: 4,770,349

[45] Date of Patent: Sep. 13, 1988

[54] METHOD FOR FINELY DIVIDING ALMOND SHELLS

[75] Inventor: Joseph W. Ayers, Easton, Pa.

[73] Assignee: Agrashell, Inc., Bethlehem, Pa.

[21] Appl. No.: 915,764

[22] Filed: Oct. 6, 1986

Related U.S. Application Data

[62] Division of Ser. No. 830,705, Feb. 18, 1986, abandoned.

[51] Int. Cl.⁴ .............................................. B02C 19/12
[52] U.S. Cl. .......................................... 241/9; 241/22; 241/24
[58] Field of Search ............... 524/15, 35; 241/101 D, 241/22, 30, 24, 79, 261.2, 261.3, 17, 6–13; 426/466; 44/1 C

[56] References Cited

U.S. PATENT DOCUMENTS

| | | | |
|---|---|---|---|
| 2,507,465 | 5/1950 | Ayers | 241/30 X |
| 2,554,450 | 5/1951 | Ayers | 241/17 |
| 3,017,303 | 1/1962 | Ayers | 524/35 X |
| 3,938,965 | 2/1976 | Pyle | 44/1 C |
| 4,119,740 | 10/1978 | Crespo | 426/466 X |

*Primary Examiner*—Mark Rosenbaum
*Attorney, Agent, or Firm*—Curtis, Morris & Safford

[57] ABSTRACT

Finely divided almond shell flour is used as an extender in plywood- and laminating-adhesives, alone or in combination with other, different, vegetable shell flours.

3 Claims, No Drawings

METHOD FOR FINELY DIVIDING ALMOND SHELLS

This application is a division of application Ser. No. 830,705, filed Feb. 18, 1986 and now abandoned.

The present invention relates to compositions comprising finely ground almond shells (almond shell flour), alone or in combination with other, different, vegetable shell flours, which compositions are adaptable to use as extenders for aqueous emulsion glues in the formulation of plywood- and laminating-adhesives, and to such adhesives.

The formulation of plywood- and laminating-adhesives from aqueous emulsions of synthetic or natural glues using finely ground natural materials as an extender is well known in the prior art.

Thus, U.S. Pat. No. 3,017,303, incorporated herein by reference discloses the formulation of such adhesives from emulsions of synthetic phenol-aldehyde or amine-aldehyde resins. The extenders employed in such adhesives include flours produced from nut shells such as walnut (English and black), hickory, palm, and filbert; from pit shells of fruits such as peach, plum, and apricot; and from grain and seed hulls such as oat hulls; and wood flours.

Often, the properties of such extenders may not meet the ever-more rigorous requirements imposed by industry on the adhesives used for preparing plywood, veneers, and other wood laminates. According to the present invention, the provision of finely divided almond shell flour and, particularly, blends thereof with other vegetable shell flours, permits the formulation of extenders which, when used to formulate plywood- and laminating-adhesives with a particular glue formulation, will impart optimum properties to the adhesives, particularly from the point of view of viscosity and stability. Alternatively, the use of the extenders permits one skilled in the art a greater latitude in his choices for blending aqueous glue emulsions when formulating adhesives meeting industry requirements.

The basic requirements for an extender to be used successfully in synthetic resin mixes compounded as adhesive for the assembly of multi-layer plywood and other laninates are as follows:

1. Adequate commercial availability of the extender to fill the large tonnage requirements of the consuming plywood glue mixers at all times.

2. Uniformity of the physical and chemical properties of the extender from shipment to shipment.

3. The development of predictable and uniform rheological properties of glue mixes by the extender used in the mix under varying plant operating conditions, including changes in atmospheric environment.

4. The extender must be free of toxic substances harmful to humans and free of oversized particles, especially those of an abrasive nature. Abrasive extenders dull mill cutting tools and saws.

5. There must be complete compatibility of the extender with all compounding ingredients used in the synthetic resin adhesive composition.

6. Although there have been small quantities of extenders offered for use in the plywood industry that contain substantial percentages of inorganics such as clays, extender formulators prefer raw materials of organic origin.

7. Extenders used in adhesive formulation usually have either an accelerating or decelerating effect on the rate at which glue lines cure under temperature and pressures applied during the pressing of the assembled plies. Extenders that accelerate cure are desired so the rate of production will be increased through the pressing stage.

8. Any organic material used in any extender that is edible by rodents is objectionable. An extender must not attract rats, mice or other rodents.

9. The physical and chemical properties of an extender must remain uniform and unchanged when stored for long periods of time in commercial packages. Some extenders absorb excess moisture at high atmospheric humidity.

10. The mixing of aqueous synthetic resin glue compositions is accomplished commercially with a variety of mechanical mixer types that are generally classified into two varieties, namely, high shear or low shear. High shear mixing machinery is preferred in the plywood industry. The extender being mixed into the glue solution must not cause foaming or dusting. The extender should also mix and disperse readily into the glue solution in short periods of time. Flocculation, coalescence, or separation of the extender in mixed glues causes settling and clogging in the glue transport system, which is unacceptable.

11. The finished glue adhesive is applied to core wood used in plywood assembly by three methods of application, namely roll, spray or curtain coating. Roll coating is now limited to a few plywood mills. Spray coating is most popular, followed by curtain coating, a strong competitor. Extenders are known to cause discontinuous patterns in spray and curtain application systems. Known in the industry as "throw-out" or "blips", such interruptions disturb the continuity of spray and curtain patterns and cause nonuniform glue distribution over the surface of core wood. Such conditions cannot be tolerated in plywood assembly systems.

The finely divided almond shell products of the present invention are derived from a large variety of almond shells that are by-products of almond shelling operations where the almond kernel is separated from the shell. According to the invention, the shells are crushed and reduced in size to flours no coarser than 100 percent through a 150 mesh screen (U.S. Standard Screen) and not finer than 100 percent through a 325 mesh screen (U.S. Standard Screen). When used alone or blended with other low viscosity extender type products used in the formulating of synthetic resin glues for bonding the plies of plywood, these almond shell flours increase the viscosities of the glues to desired flow rates for use in roll, spray, or curtain coating applicators that distribute the glue emulsion evenly and uniformly to ply core wood surfaces.

All almonds harvested in the United States are grown in California. The bulk of each year's crop comes from five counties in the state, namely, Kern, Stanislaus, Merced, Fresno, and Butte, with Kern County growing the largest tonnage. The total crop processed varies from year to year and is reported by the United States Department of Agriculture as total pounds of kernels. For example, a good yearly crop would be 575,000,000 lbs. of kernels and a poor year would yield only 300,000,000 lbs. of kernels. There are about 40 varieties of almonds grown. About 63 percent of the total crop is of the Nonpareil soft shell variety and 9 percent are the hard shell Mission variety, the balance being Merced, Carmel, Peerless, Neplus, and many others. When the nuts are collected after being hulled for processing, they are blended into two general classifications, soft and hard. After cracking, the shell is separated from the kernel. The kernel weight is approximately the same as the shell weight. There is always a small percentage of pieces of hull in the shell that remains in the harvested crop as it comes from the orchards.

The yield of the soft shell in pounds is 5 to 1 compared to the hard variety. Of all the tree nut varieties consumed, almond usage is increasing faster on a per capita basis than any of the other varieties and the yearly ratio of increase is expected to continue for many years. As the demand for almonds goes up, so, also, does the supply of by-product almond shells. The availability of large tonnages of almond shells makes this crop of shells attractive for commercialization, particularly as an ingredient in the manufacture of extenders used by the plywood industry.

One problem which has heretofore severely hindered the industrial use of almond shell flours as extenders or for oter purposes is the difficulty encountered in grinding the shells to the requisite particle size. Almond shells have a low bulk density of about 19-20 lbs./ft.$^3$ and, when ground between the discs of an attrition mill such as is conventionally used in the art for grinding vegetable shell product, become overly heated, reach their combustion point, and burst into flame. This problem has been solved by the present applicant by using a mill employing a high speed (about 5000 rpm) rotating disc having hammers on the periphery thereof. The mill, which is commercially available under the mark "BEPEX", has water cooled jackets to maintain operation below the combustion temperature. Coarse materials are automatically returned to the mill until reduced to the desired particle size.

Such impact grinding involves power consumption greater than that required for commercial attrition mills in which materials to be ground are introduced between two discs, rotating in opposite directions at about 1700 rpm and having serrated or textured faces between which the particles are ground. In these attrition mills, size reduction is effected to a considerable degree by interparticle abrasion. The applicant has found that such a conventional mill can also be used to grind almond shells by first blending the shells with vegetable shell materials of greater bulk density and hardness. For example, the blends of almond shell flour with other nut shell flours which are preferred according to the present invention are suitably prepared in this manner.

In any event, in these blends, the size range of the particles of shells such as walnut, filbert, pecan, or the like is the same as that specified earlier for the almond shell flour. Hence, blends meeting these size requirements are conveniently prepared by grinding the shell components together, as discussed above.

Prior to grinding, raw naturally occurrirg shell materials are first cleaned to remove any residual nut meat and, for example in the case of walnut, to remove the pericarp or fine paper-like web structures found in the shell. The shells are then reduced to a coarse size (about ¼ inch) convenient for handling by conventional industrial means (conveyors, pnematic systems) in a pregrinding or crushing operation. Then, if blends of shell materials are to be prepared, the requisite coarse shell materials are combined in the desired proportion and introduced into an apparatus, e.g. an attrition mill as described earlier for blends of almond shell with harder and denser shells such as walnut or filbert having a bulk density of about 33-35 lbs./ft.$^3$. The higher density shells assist in the attrition of the almond shell without clogging or combustion so that the blends can be directly prepared with economic low power consumption.

Thus, for example, almond shells and English walnut shells are separately coarsely divided into about ¼ inch size in a hammer mill provided with a screening arrangement for removing nutmeats, pericarp, and other objectionable materials from the ground shells. Forty parts by weight of the coarsely divided almond shells are next blended with 60 parts by weight of coarsely divided walnut shells in a mass which is then conveyed to the "eye" of a conventional attrition mill (e.g. a Bauer attrition mill commercially available from the Combustion Engineering Co., Springfield, Ohio). For grinding shell materials of this kind, the mills are appropriately modified according to U.S. Pat. No. 2,554,450 to introduce cooling water into the mill to maintain the ground shells at a temperature of about 288° F. and to exclude air from the mill by the generation of steam therein. On leaving the mill, the ground mixture of almond and walnut shells is cooled and conveyed to air separators to fractionate the particles. Insufficiently ground material is returned to the mill, typically in an amount about six times the weight of the isolated desired mixed particles.

In the extender blends according to the present invention, the presence of any almond shell flour in the blend will modify the properties of the other component or components of the blend. Hence, the present invention can be considered as pertaining to extenders which comprise anywhere from a few percent to 100 percent of almond shell flour.

However, for the compounding of the plywood- and laminating-adhesives conventionally employed in the art, blends of almond shell flour with other vegetable shell flours will usually contain from 20 to 80 percent by weight of almond shell flour and 80 to 20 percent of other, different vegetable shell flours. Preferred blends will comprise from 30 to 70 percent, or 40 to 60 percent, of almond shell flour, with 70 to 30 percent, or 60 to 40 percent of other, different flours. The most preferred blends according to the invention, in which almond shell flour is combined with English walnut or filbert shell flours, comprise about 40 to 60 percnnt of almond shell flour.

The formulation of adhesives from aqueous emulsions of synthetic resins and the extenders according to the present invention follows techniques known to those skilled in the art from aforementioned U.S. Pat. No. 3,017,303. As there described, suitable phenol-aldehyde glues (e.g. phenol-aldehyde, resorcinol-aldehyde) having a solids content of 40-50 percent by weight (typically 42 percent) are prepared by reacting one molar part of phenol with two molar parts of an aldehyde such as formaldehyde in the presence of an alkali such as sodium hydroxide at 85° C.-100° C. until the proper viscosity is reached and then diluting with water as desired. The patent similarly exemplifies the production of a typical amine-formaldehyde glue (e.g. urea-formaldehyde, melamine formaldehyde) by reacting 160 parts by weight of formalin (37%), 2 parts by weight of ammonium hydroxide (28%), and 1 part by weight of sodium acetate at 90° C. for 2 hours. The pH is adjusted by addition of more ammonium hydroxide if necessary and excess water is removed by vacuum distillation to reach the proper solids content.

The combination of such synthetic resin emulsions with the extenders of the present invention also takes place a disclosed in U.S. Pat. No. 3,017,303. The plywood- and laminating-adhesives to be prepared are typically characterized by the ratio by weight of resin to extender to water therein. For typical 40-50% phenolic resin emulsions, a high quality resin/extender/water ratio is taught to be 5/1/1.75. However, as for the adhesives of the prior art, the quantities of extender and water can be increased according to the present invention to define compositions having ratios of 5/1.2-2.8/1.8-5.5, for example. As known to those skilled in the art and as discussed in the aforementioned patent, satisfactory adhesives can be formulated with ratios within or without the aforementioned ratios, depending on the resin system, its concentration in the emulsion the nature of the extender and its state of subdivision, other components such as fillers, on pH, and on the conditions of mixing (e.g. high shear as in a Cowles mixer or low shear as in a paddle mixer), as well as other operational factors such as assembly time, pre-press operations, press temperature, and pressure and curing time.

It is noted that contemporary adhesive compositions are formulated by the addition of caustic soda and/or other alkalis thereto, often to reach a pH of as high as 12. This obviates any need to adjust, control, or alter the pH of the naturally occurring components of the extender to overcome natural pH variations therein, as was often heretofore required in the prior art. Also, contemporary adhesive formulations commonly include a tackifying agent (often characterized as a "filler") which is conveniently included to provide green strength to plywood and other laminates during handling prior to curing of the adhesive compositions under heat and pressure.

A better understanding of the present invention and of its many advantages will be had from the following specific examples of extenders and adhesive compositions made according to the present invention and from their comparison with prior art materials.

The superior properties of the extender compositions of the invention are evident from tests evaluating their water absorption and the viscosity enhancement and stability which they impart to adhesives formulated therewith. The tests are routinely performed in the art to evaluate the acceptability of an extender for use in synthetic glue solutions that in turn are applied to the surfaces of plywood core veneer prior to assembly of the plies of plywood before being cured under heat and pressure.

WATER ABSORPTION TEST METHOD

1. Weigh out 15.0 grams of the sample to be tested. Put the test sample into a beaker large enough to allow for the water addition and hand mixing - at least 100 ml.

2. Accurately measure 50.0 ml. of tap water in a graduated cylinder.

3. Slowly add water to the test sample from the graduated cylinder with frequent hand mixing using a metal or glass stirrer. Initial water and additions should be approximately 5 ml., followed by stirring until the mixture becomes visibly damp, at which point water additions should be in 0.5 to 1.0 ml. increments.

4. After each water addition and stirring, the beaker should be rotated slightly more than 90°. The end point of the test is established when some or all of the water addition freely flows from the test sample down the inside of the beaker. Any such free flowing water should be returned to the graduated cylinder. Determine the amount of water left in the graduated cylinder in ml. at the conclusion of the test and subtract this amount from 50.0. Report this difference as the water absorption expressed in ml.

The results of tests on the water absorption of a variety of typical organic flours used as extenders in plywood- and laminating-adhesives is reported below in Table 1.

TABLE 1

| EXTENDER | MESH SIZE | $H_2O$ ABSORPTION | MOISTURE |
|---|---|---|---|
| 1. Hard Almond | 200 | 39.2 | 2.8% |
| 2. Soft Almond | 200 | 46.6 | 2.6 |
| 3. English Walnut | 200 | 29.8 | 1.2 |
| 4. Filbert Shell Flour | 200 | 26.7 | 3.0 |
| 5. Pecan Shell Flour | 200 | 31.6 | 6.0 |
| 6. "CO-COB" (Quaker Oats) | | 27.6 | 7.8 |
| 7. 25% Soft Almond and 75% English Walnut | 200 | 33.0 | 3.0 |
| 8. 25% Hard Almond and 75% English Walnut | 200 | 34.4 | 3.4 |
| 9. Cherry Pit Flour | 200 | 24.8 | 5.0 |
| 10. Coconut Shell Flour | 200 | 38.4 | 7.0 |
| 11. "GLUFIL, HL" (Commercial extender) | 300 | 36.0 | 4.0 |
| 12. 50% English Walnut and 50% Soft Almond Shell | 200 | 44.0 | 3.8 |
| 13. 50% English Walnut and 50% Hard Almond Shell | 200 | 39.4 | 3.3 |
| 14. 50% English Walnut/ 25% Soft Almond Shell/ 25% Hard Almond Shell | 200 | 41.0 | 2.6 |
| 15. Alder Bark Flour | 200 | 36 | 5.0 |

Water absorption tests for plywood extenders yield a relative value. The test is not an accurate quantitative detmerination. However, the test is simple and consumes very little time and shows some correlation with viscosity buidling values of the different plywood glue extenders (cf. following Table 2).

"GLUFIL, HL", the commercial extender listed in the Table is the quality standard extender of the industry. It comprises 95% of −325 mesh English walnut shell flour densified and reduced in size by methods taught in U.S. Pat. No. 3,429,770. This standard material has a water absorption of 36. Soft almond shell flour has a water absorption of 46.6, while hard almond shell flour has a water absorption of 39.2. When these flours are blended with walnut shell flours, which have an absorption capacity of 29.8, the blends have absorption capacity greater than the "GLUFIL, HL" standard, namely 44, 39.4 and 41.0, respectively. This demonstrates that the almond shell products are absorption builders for lower absorption walnut shell flour and other low water absorption flours used in the plywood industry.

The "CO-COB" material identified in the Table and the "FURAFIL" of following Table 2 are also commercial extenders prepared from the residues of natural products such as corn cobs, oat hulls, etc. after extraction to remove furfural therefrom.

For testing viscosity enhancement and stability, typical adhesives are formulated according to the following recipe, using a high speed mixer.

| Add To Mixer Turn Mixer On | Water | 150 gms. |
|---|---|---|
| Add | Wheat Flour ("filler") | 50 gms. |
| | Extender | 75 gms. |

| | | |
|---|---|---|
| Mix 3 Minutes | | |
| Add | Resin (phenol-formaldehyde) | 225 gms. |
| Mix 2 Minutes | | |
| Add | 50% Caustic | 32 gms. |
| Mix 15 Minutes | | |
| Add | Resin (phenol-formaldehyde) | 450 gms. |
| Mix 5 Minutes | | |
| Total Mix | | 983 gms. |

A 400 ml. beaker Is filled with the resulting mix for viscosity testing. The balance of the mix is discarded. Testing is done on a Brookfield Viscometer immediately after mixing is finished and time/temperature/viscosity are recorded. Then the mix is stirred and temperature and viscosity are redetermined after one hour and after 24 hours of storage at room temperature (approximately 72° F.). Viscosities can be measured using #4 or #5 spindles at 10 or 20 rpm. A #5 spindle at 10 rpm. is generally used.

Mix viscosities are relative, and vary dramatically with different components such as the wheat flour filler, the extenders, and water sources. "Standard" batches are run at the beginning and end of all test series.

Following Table 2 shows the viscosity values developed in such testing by various extenders.

TABLE 2

| | #5 Spindle VISCOSITIES @ 10 RPM (cps) | |
|---|---|---|
| EXTENDER | (Initial) | (24 hrs.) |
| 1. "GLUFIL, HL" (Industry Standard) | 5,000 | 7,500 |
| 2. Soft Almond flour (200 Mesh) | 11,400 | 13,700 |
| 3. Hard Almond flour (200 Mesh) | 8,800 | 9,500 |
| 4. 50% Soft Almond/50% Walnut Shell flour (200 Mesh) | 4,500 | 6,500 |
| 5. 50% Hard Almond/50% Walnut Shell flour (200 Mesh) | 5,100 | 6,200 |
| 6. 25% Soft Almond/25% Hard Almond/ 50% Walnut Shell flour (200 Mesh) | 3,800 | 5,000 |
| 7. "FURAFIL" (Commercial Extender) | 3,650 | 4,700 |

The viscosities shown for the "GLUFIL, HL" extender (No. 1) in the above Table are within a range for normal commercial application and can be adjusted for use in any one of the three commercial glue spreading methods used in the plywood industry, namely roll, spray, or curtain coaters. The percentage change in the standard viscosity at the end of a 24 hour standing period is greater for the "GLUFIL, HL" industry standard than for any of the other listed extenders that contain almond shell flours as part of their composition. This means that the use of plywood extenders containing almond shell impart greater stability to glues than "GLUFIL, HL", the industry standard.

Glue mixes compounded according to the glue formulation used for these testing purposes with the soft and hard almond shell flours only (Nos. 2, 3) have viscosities too high for practical commercial use. However, these flours can be used alone as extenders for plywood- and laminating-adhesives by suitable alteration of the glue formula now routinely used in the plywood industry. As has been previously shown (water absorption Table 7), the soft almond flour has a higher water absorption than the hard almond, 46.6 and 39.8, respectively.

The glue viscosities of these two products, when blended with walnut shell flour or other flours, often show reverse orders of magnitude in viscosity as illustrated by extenders Nos. 4, 5, and 6 in the above Table 2. Extenders Nos. 2 and 3 demonstrate the tremendous viscosity building capacity these products have when used in standard synthetic phenol-formaldehyde plywood glues.

The performance of blended shell compositions as shown in the Table 2 will be very similar when used in urea-formaldehyde glues.

Following Table 3 compares the plywood properties of seven commercial plywood glue extenders now being sold to the plywood industry with samples of compositions comprising soft and hard almond shell flour (−200 mesh in size).

There are some striking differences in the properties of these different materials. There are three walnut shell flour products in the group, a 200 mesh size, a 325 mesh size, and "GLUFIL, HL" (a 300 mesh size commercial product). All three products are very similar in physical properties except for screen mesh size that can be observed from the screen analysis. Products Nos. 1 and 2 are light. tan·in color. Products Nos. 3, 4, 5, and 7 are dark brown in color and when added to glue mix and the mix spread on plywood veneer, the glue line is darker in color and remains darker in color in the finished plywood product. A dark glue line is preferred by the plywood industry because wood failure testing for product quality is determined much more accurately on dark colored glue in sheared test pieces. Indeed, it is common in the art to add a small amount of carbon black to the extender during blending in order to deepen its color.

The ash content of extenders is an important value. These values vary widely; for example, product No. 4, a composite of three components, has a very low ash content of ½-1 percent. In contrast, other composites Nos. 5 and 6 both have very high ash contents of 12–15 percent and 35–40 percent, respectively. The ash of product No. 5 is silica, which is very abrasive to cutting tools and saws used in plywood manufacture. The ash in No. 6 is clay which has a high silica content and is also abrasive. Product No. 4, having a very low ash content, is a non-abrasive extender. The screen mesh size (grain or particle size values) of extenders is of interest to plywood glue formulators. The presence of large particles or grains, i.e. anything larger than that which will pass through a 150 mesh screen, causes glue spreading problems. These particles clog spray nozzles and develop discontinuances in curtain coater patterns. Extender No. 6, a very coarse product, does not meet industry extender standards, yet it is sold and used in some plywood mills on price. The particle size range of No. 7 is borderline and is used where quality can be sacrificed. The commercial product No. 4 containing almond shell flour is made to top size fineness of not more than 10 percent of the product weight being retained on a 200 mesh screen, which is acceptable to plywood glue formulators.

TABLE 3

PHYSICAL PROPERTIES OF EXTENDERS

| | PRODUCT | % MOISTURE | pH | % ASH | Bulk Density Lbs./cu. ft. | COLOR | On 100 mesh | −100/+200 mesh | Thru 200 mesh |
|---|---|---|---|---|---|---|---|---|---|
| | | | | | | | SCREEN ANALYSIS | | |
| 1 | Walnut Shell Flour 200 Mesh | 5–8 | 5 | 0.5 | 40 | Lt. Tan | 0 | 10% max. | 90% min. |
| 2 | Walnut Shell Flour 325 Mesh | 5–8 | 5 | 0.5 | 35 | Lt. Tan | 0 | Tr. | 100% |
| 3 | "GLUFIL, HL" 300 Mesh Commercial Extender | 5–8 | 5 | 0.5 | 40 | Dk. Brown | 0 | Tr. | 100% |
| 4 | 25% Soft Almond/ 25% Hard Almond/ 50% Walnut Shell Flour 200 Mesh | 4–8 | 5 | 0.5–1.0 | 35 | Dk. Brown | 0 | 10% max. | 90% min. |
| 5 | "FURAFIL" (Commercial) (Cocob & Phenofil) 200 Mesh | Varies - currently 20+ | 2.5 | 13–15 | 30 | Very Dk. Brown | Tr. | 10% max. | 90% min. |
| 6 | "PLY-X" (Commercial) 100 Mesh | 5–9 | 6 | 35–40 | 35 | Off White | 10% max. | 25% | 65% min. |
| 7 | Pecan Shell Flour (Hammon's) 100 Mesh | 5–8 | 5 | 3–4 | 35 | Dk. Brown | 5–10% | 20–25% | 70% min. |
| 8 | Hard Almond Shell Flour −200 Mesh | 3–8 | 5 | 1.0 | 30 | Lt. Tan | 0 | 10% max. | 90% min. |
| 9 | Soft Almond Shell Flour −200 Mesh | 3–8 | 5 | 1.0 | 30 | Lt. Tan | 0 | 10% max. | 90% min. |

The almond shell flours of the present invention are of particular utility for blending with filbert shell flours in the manufacture of extenders according to the present invention.

Ideal weather conditions for the growing of filbert nuts are found in the West central region of Oregon, the only part of the United States where filbert nuts are grown. By comparison with other tree nut crops, the yearly crop of filberts is plus or minus 18,000 tons/yr. (2,000 lbs./ton). The crop is reported by the weight of shell nuts harvested. There is a small number of processors who merchandise each year's crop as "nuts in the shell" and as kernels removed from the shell. The normal yearly accumulation of by-product filbert shells is 6,000 to 7,000 tons. Some are sold as fuel and the balance is consumed in cattle feed.

The Northwestern plywood industry is located in the Province of British Columbia, Canada, and in Washington, Oregon, and northern California. By-product filbert shell flour, when properly blended with a viscosity building flour such as almond shell flour, makes an economically attractive and useable extender for plywood adhesives since the by-product filbert shells are centrally located in the northwestern plywood industry area.

Attempts have been made to grind these shells to flour and sell the flour as an extender for use in synthetic resin adhesive glues for structuring plywood. The plywood industry could not use filbert shell flour because of very low water absorption and poor viscosity build-up in adhesive glue mixes.

Following Tables 5, 6, and 7 report viscosity data for filbert shell flour blended with almond shell flour. The almond flour provides the necessary viscosity enhancement to bring the blends into workable viscosity ranges for application of glue adhesives to core wood used in the assembling and gluing of plywood.

For obtaining the reported data, glue mixing was carried out as earlier described with samples of 1000 grams of the glue mix. Constant room temperatures of 70° F. ±2° F. were maintained. For measuring viscosity, spindle #4 at 12 rpm was used in the Brookfield Viscometer. Calculated values are expressed in centipoises. A commercial "PF-547" phenolic resin having approximately 43 percent solids content was diluted with water and mixed with the various extender samples, and with the other ingredients.

TABLE 5

GLUE VISCOSITY

| | Extender | Resin quantity used in initial glue mix | Viscosity (cps) After 1 Hr. Activation with spindle #4 12 rpm | After 24 hrs. with spindle #4 12 rpm |
|---|---|---|---|---|
| 1 | "GLUFIL, HL" Commercial Extender | high medium | 5,500 7,500 | 6,700 13,000 |
| 2 | 200 Mesh Filbert Shell Flour | high medium | 1,500 4,750 | 1,250 8,000 |
| 3 | 325 Mesh Filbert Shell Flour | high medium | 2,650 5,100 | 3,000 7,500 |
| 4 | 200 Mesh Filbert 20 percent / 325 Mesh Almond 80 percent | high medium | 8,700 10,000 | 6,500 8,000 |
| 5 | 200 Mesh Filbert 50 percent / 325 Mesh Almond 50 percent | high medium | 4,500 9,000 | 5,000 12,250 |
| 6 | 200 Mesh Filbert 80 percent / 325 Mesh Almond 50 percent | high medium | 2,000 7,500 | 3,250 10,250 |
| 7 | 325 Mesh Filbert 20 percent / 325 Mesh Almond 80 percent | high medium | 8,250 13,750 | 10,500 15,000 |
| 8 | 325 Mesh Filbert 50 percent / 325 Mesh Almond 50 percent | high medium | 6,000 8,500 | 6,500 11,500 |
| 9 | 325 Mesh Filbert 80 percent / 325 Mesh Almond 20 percent | high medium | 2,500 7,000 | 2,000 8,500 |

TABLE 6
GLUE VISCOSITY

| | Extender | 1 hr. after mixing: |
|---|---|---|
| 1 | "GLUFIL, HL" Commercial Extender | Viscosities are in the median range for commercial use. |
| 2 | 200 Mesh Filbert Shell Flour | Viscosities are below acceptable commercial use ranges. |
| 3 | 325 Mesh Filbert Shell Flour | Viscosities of this finer size product are low for normal commercial use. Will work in specialty applications only, with high viscosity resin. |
| 4 | 200 Mesh Almond 20%<br>325 Mesh Almond 80% | Viscosities of this blend containing almond flour are acceptable in limited number of applications. |
| 5 | 200 Mesh Filbert 50%<br>325 Mesh Almond 50% | Viscosities are in a normal working range. |
| 6 | 200 Mesh Filbert 80%<br>325 Mesh Almond 20% | Viscosities are in low range useable only with high viscosity resin glue. |
| 7 | 325 Mesh Filbert 20%<br>325 Mesh Almond 80% | The 325 mesh size blend of 80%/20% almond and Filbert flours produce excessive viscosities. Could be used with very low viscosity resins. |
| 8 | 325 Mesh Filbert 50%<br>325 Mesh Almond 50% | Median viscosities develop with the use of this blend in normal glue mixes. |
| 9 | 325 Mesh Filbert 80%<br>325 Mesh Almond 20% | Viscosities of this finer size product are low for normal commercial use. Will work in specialty application with high viscosity resins. |

TABLE 7
GLUE VISCOSITY

| | Extender | After standing 24 hours: |
|---|---|---|
| 1 | "GLUFIL, HL" Commercial Extender | Median viscosities are normal in standard resin glue formulations. |
| 2 | 200 Mesh Filbert Shell Flour | Shows instability on aging. Viscosity much too low. |
| 3 | 325 Mesh Filbert Shell Flour | Viscosities are below commercial use levels. |
| 4 | 325 Mesh Filbert 20%<br>325 Mesh Almond 80% | Viscosities are above normal use ranges. Lack of stability is restrictive. Formulate with low viscosity resin. |
| 5 | 200 Mesh Filbert 50%<br>325 Mesh Almond 50% | Median viscosities are normal for commercial use. |
| 6 | 200 Mesh Filbert 80%<br>325 Mesh Almond 20% | Same as #5. Viscosity variations excessive. |
| 7 | 325 Mesh Filbert 20%<br>325 Mesh Almond 80% | Special formulation could adapt this high viscosity blend. |
| 8 | 325 Mesh Filbert 50%<br>325 Mesh Almond 50% | Same as #1. |
| 9 | 325 Mesh Filbert 80%<br>325 Mesh Almond 20% | This blend shows lack of stability due to high percentage of fine Filbert Shell Flour. Can be used with high viscosity resins. |

The American plywood industry manufactures plywood to quality standards dictated by the American Plywood Association (APA) located in Tacoma, Wash. The standard adhesive policy of this Association was established and published on Mar. 1, 1980. Section "F" of this publication entitled "Plant Trials of Approved Adhesive for Etenders" sets approval standards for plywood glue performance and at the same time these procedures are effective in screening the quality and performance of extenders used in such plywood glues.

An extensive testing program using the APA standard test procedures was planned and completed to show extender values and performance of a number of compositions containing various amounts of almond shell flour blended with walnut shell flour or filbert shell flour. The glue formulations and mixing procedures used for these tests are generally the same for the various resins used by the industry. The procedure for making the glues using Georgia Pacific phenol-formaldehyde plywood glue "GP-553" resin (42 percent non-volatile solids) is shown below. Different formulations are shown for high shear mixing (e.g. using a Cowles mixer) and for low shear mixing (e.g. using a paddle stirrer).

| Mix Ingredients and Mix Times | High-shear | Low-shear |
|---|---|---|
| | (Parts by Weight) | |
| Water | 725 | 625 |
| "Glu-X" wheat flour filler mix until wet | 200 | 200 |
| Extender mix until wet (3 minutes) | 350 | 350 |
| "GP 553" Resin (42 percent N.V. solids) mix 3 minutes | 900[a] | 900[a] |
| Sodium hydroxide (50 percent) mix 15 minutes | 135 | 135 |
| "GP 553" Resin (42 percent N.V. solids) mix 2 minutes | 1800 | 1800 |
| Total mix | 4110 | 4010 |
| Mix Characteristics | Percent | |
| Resin solids | 27.6 | 28.3 |
| Filler[b] | 7.7 | 7.8 |
| Extender[b] | 4.4 | 4.5 |
| Sodium hydroxide | 1.6 | 1.7 |
| Total mix solids | 41.3 | 42.3 |
| Total mix water | 58.7 | 57.7 |
| Total mix | 100.0 | 100.0 |

[a]The premix resin is varied to meet mix viscosity requirements.
[b]The filler and extender are assumed to have 10 percent moisture content in these calculations.

Following Table 8 evaluates various glue extenders from the point of view of wood failure averages.

TABLE 8
GLUE EXTENDERS BY WOOD FAILURE AVERAGES

| | Extender | % Average Wood Failure |
|---|---|---|
| 1 | "GLUFIL, HL" Conventional Extender | 95% |
| 2 | 20% 325 Mesh Filbert Flour<br>80% 325 Mesh Almond Flour | 94% |
| 3 | 80% 325 Mesh Filbert Flour<br>20% 325 Mesh Almond Flour | 92% |
| 4 | 50% 325 Mesh Filbert Flour<br>50% 325 Mesh Almond Flour | 91% |
| 5 | 80% 200 Mesh Filbert Flour<br>20% 325 Mesh Almond Flour | 88% |
| 6 | 50% 200 Mesh Filbert Flour<br>50% 325 Mesh Almond Flour | 93% |
| 7 | 20% 200 Mesh Filbert Flour<br>80% 325 Mesh Almond Flour | 92% |

The American Plywood Association's passing requirement for wood failure is 85 percent. In the above test series, all seven test blends passed with a satisfactory margin of safety. Wood failures above 90% are normally classified as of excellent quality. Only one blend (No. 5) had a wood failure of less than 90% - at 88%. This product, having a below 90% wood failure, was adversely depressed by the 80% filbert shell flour in it which, by itself, develops poor wood failure. The constructive effect of almond shell flour in the above blends is evident.

Plywood mills usually pre-press plywood panels in load-bundle fashion prior to hot pressing. Cold glue tack on the glue line sticks to the panels so the separate veneers stay together during loading of hot press preloaders and the hot presses which have relatively narrow openings, 30 to 50 in number. Poor pre-press tack prevents proper loading procedures and results in reject plywood panels. The degree of pre-press tack in part is determined by resin properties and solvent loss after adhesive application to the veneer. The time after adhesive application includes stand time without pressure and pre-press time under pressure. The adhesive mix solvent loss is influenced by extender properties, water in the glue mix, veneer moisture, and temperature and mix visorsities. The numerical value of pre-press properties is determined by an unsophisticated test. The stand/pre-press/stand times used in the test typify the worst possible conditions for prepress. Fifty pounds pull in the test causes complete wood failure and therefore there is no need to exceed this value. If, under any of the conditions of the test, approximately 40–55 lbs. pull an be realized, then prepress is considered to be satisfactory.

Four typical extenders were tested for the prepress characteristics reported in following Table 9. All the extenders tested have satisfactory values.

TABLE 9

| | | Extender Characteristic Data with "GP-553" Resin | | | |
|---|---|---|---|---|---|
| | | #1 Commercial Extender "FURAFIL" | #2 70% Walnut 30% Almond (200 Mesh) | #3 50% Walnut 50% Almond (200 Mesh) | #4 30% Walnut 70% Almond (200 Mesh) |
| Characteristic | Basis | | | | |
| Raw Material | Source | Blend | Nut Shell Blends | Nut Shell Blends | Nut Shell Blends |
| Ash | % | 13 | 1 | 1 | 1 |
| High-shear std. mix-premix resin | % of total mix resin | 34 | 37 | 48 | 48 |
| High-shear mix, mix stability | Viscosity at 25° C. | | | | |
| Initial | cps | 3650 | 3050 | 2300 | 2950 |
| After 24 hrs. | cps | 4700 | 4100 | 3850 | 3200 |
| After 48 hrs. | cps | 5250 | 3800 | 3500 | — |
| After 1 Week | cps | 5400 | 5000 | — | 4100 |
| Curtain - std. mix | S-satisfactory U-unsatisfactory | S | S | S | S |
| Spray - std. mix | | S | S | S | S |
| Low-shear paddle mix viscosity | Initial cps | 6000 | 3700 | 3850 | 7200 |
| Premix resin (low-shear mix) | % of total mix resin | 30 | 40 | 40 | 45 |
| Roll coater | S-satisfactory | S | S | S | S |
| Prepress (stand/prepress/stand) | Lbs.-pull | | | | |
| 3/3/0 minutes | 50 max. | 50 | 26 | 7 | 12 |
| 5/5/0 minutes | 50 max. | 50 | 50 | 50 | 50 |
| 7/3/4 minutes | 50 max. | 50 | 50 | 50 | 50 |

At least 20 plywood panels were made with each of the four extenders shown in Table 9. Ten tension-shear specimens per panel were prepared for each panel with five designed to pull with lathe checks open and 5 with lathe checks closed. All extenders made excellent plywood, as reported below in Table 10.

TABLE 10

| | Plywood Shear Test Performance Average in Percent Wood Failure | | | | | | | |
|---|---|---|---|---|---|---|---|---|
| | #1 Commercial Extender "FURAFIL" | | #2 70% Walnut 30% Almond (200 Mesh) | | #3 50% Walnut 50% Almond (200 Mesh) | | #4 30% Walnut 70% Almond (200 Mesh) | |
| | psi | % WF | psi | % WF | psi | % WF | PSI | % WF |
| Plywood cure rate test (Hot press time) | | | | | | | | |
| 2½ minutes | 121 | $^a76^T$ | 186 | 91 | 171 | 94 | 196 | 90 |
| 2¾ minutes | 151 | $81^T$ | 161 | 98 | 182 | 98 | 184 | 98 |
| 3 minutes | 147 | $^b67^D$ | 232 | 91 | 188 | 94 | 200 | 96 |
| 3½ minutes | 135 | 84 | 208 | 94 | 188 | 96 | 213 | 98 |
| 4 minutes | 170 | 97 | 205 | 94 | 195 | 95 | 180 | 94 |
| Assembly time test at 80° F. | | | | | | | | |
| 10 minutes | 95 | 95 | 223 | 85 | 181 | 94 | 167 | 95 |
| 20 minutes | 170 | 95 | 205 | 94 | 195 | 95 | 180 | 94 |
| 40 minutes | 84 | 97 | 158 | 96 | 183 | 92 | 165 | 90 |
| Assembly time at 120° F. | | | | | | | | |
| 10 minutes | 97 | $82T$ | 158 | 98 | 146 | 98 | 194 | 92 |
| 20 minutes | 133 | 89 | 178 | 90 | 135 | 99 | 184 | 99 |

TABLE 10-continued

| | Plywood Shear Test Performance Average in Percent Wood Failure | | | | | | | |
|---|---|---|---|---|---|---|---|---|
| | #1 Commercial Extender "FURAFIL" | | #2 70% Walnut 30% Almond (200 Mesh) | | #3 50% Walnut 50% Almond (200 Mesh) | | #4 30% Walnut 70% Almond (200 Mesh) | |
| | psi | % WF | psi | % WF | psi | % WF | PSI | % WF |
| 40 minutes | 127 | 95 | 156 | 72$^{D*}$ | 187 | 93 | 190 | 86 |

$^a$T—Transfer; undercure appearance
$^b$D—Poor or no transfer; dried out appearance
*Poor wood In Table 10, extender No. 2 showed some minor under-cure as measured by percent wood failure at short assembly times (10 minutes) at 80° F. Extender No. 2 showed some significant dryout at the longest assembly time (40 minutes) at 80° F., which was due to poor wood quality. All of the data relating to assembly time at 80° F. for the extenders of the invention were comparable to the results obtained with "FURAFIL".

At 120° F., the control "FURAFIL" showed some minor under-cure at the shorter assembly time (10 minutes) as measured by the distribution of percent wood failure's. Wood failures were excellent for test samples Nos. 2, 3, and 4.

Test extenders Nos. 2, 3, and 4 were better than the No. 1 "FURAFIL" commercial extender in cure rate.

Ash content—Sample No. 1, the control, has a very high ash content. The ash content of samples Nos. 2, 3, and 4 are maximum one percent (1%).

The quantity of pre-mix resin used in formulations Nos. 3 and 4 is excessive, causing low viscosity values. Mix stability, roll coating, curtain coating, and spray coating all performed satisfactorily with all samples. Low shear paddle mixes were all normal for all samples. Pre-mix resin in low-shear mixing was normal for all samples.

Prepress results—(Values given at stand/prepress/-stand)
At 3/3/0 - samples 2, 3, and 4 were weak.
At 5/5/0 - normal plant practice was represented.
At 7/3/4 - Pull values were maximum and excellent at 50 lbs.

A series of viscosity and shear performance tests were completed on four different types of almond shell flours. Two samples were made from hard almond shells in two mesh sizes, 200 mesh and 325 mesh. The other two samples were prepared from soft almond shells in the same mesh sizes, 200 mesh and 325 mesh. This series of tests was made to demonstrate that standard quality commercial plywood glued with adhesives containing only almond shell flour as the extender in glue formulation is feasible.

Following Table 11 shows the glue formulations while Table 12 reports the shear test values.

TABLE 11

| | ADHESIVE GLUE FORMULATION AND MIXING PROCEDURE (Quantities shown are in pounds) | | | |
|---|---|---|---|---|
| Ingredient | #1 −200 Mesh Hard Almond Shell | #2 −325 Mesh Hard Almond Shell | #3 −200 Mesh Soft Almond Shell | #4 −325 Mesh Soft Almond Shell |
| Water | 251.5 | 251.5 | 251.5 | 251.5 |
| Extender | 74 | 74 | 74 | 74 |
| Wheat Flour | 59 | 59 | 59 | 59 |
| Resin - PF-547 | 314 | 314 | 314 | 314 |
| | | MIX 5 MINUTES | | |
| 50% NaOH | 37 | 37 | 37 | 37 |
| | | MIX 5 MINUTES | | |
| Soda Ash | 5.5 | 5.5 | 5.5 | 5.5 |
| | | MIX 10 MINUTES | | |
| Resin PF-547 | 259 | 259 | 259 | 259 |
| | | MIX 5 MINUTES | | |
| TOTAL WEIGHT TO MIX | 1,000 | 1,000 | 1,000 | 1,000 |
| One Hour Mix Viscosity-cps 27° C. Spindle #4 @ 12 rpm | 4,400 | 4,000 | 6,500 | 4,500 |
| 24 Hr. Mix Viscosity-cps 27° C. Spindle #4 @ 12 rpm | 6,000 | 9,000 | 8,750 | 4,500 |

TABLE 12

PLYWOOD SHEAR TEST PERFORMANCE
Averages of Percent Wood Failure
Veneer at 6 Percent MG

| Extender | Glue Spread 60 lb./MDGL |
|---|---|
| −200 Mesh Hard Almond Shell | 89% |
| −325 Mesh Hard Almond Shell | 93% |
| −200 Mesh Soft Almond Shell | 92% |
| −325 Mesh Soft Almond Shell | 91% |
| | 91.5% Average |

Observations on the performance of all four almond shell flours listed in Table 11 are as follows:

1. Glue mixing was performed with more than a normal amount of premix resin in making of the glue.

2. Glue viscosities developed were within normal commercial working ranges.

3. Wood failures listed in Table 12 averaged 91.5%. An 85% wood failure average passes the American Plywood Association specification requirements.

What is claimed is:

1. A method for finely dividing the hard, naturally occurring, outer sheel of almonds, after cracking and separation from the almond kernel, to particle sizes ranging from 150 mesh to finer than 325 mesh, which method comprises introducing coarsely divided hard outer almond shells into a conventional attrition mill together with other, different, coarsely divided vegatable shell material having a higher bulk density and hardness than that of said almond shells, whereby a mixture of ground hard outer almond shells and ground shells of said other vegetable material is obtaine, and then sorting said mixture to isolate particles of the desired size from said mixture.

2. A method as in claim 1 wherein said other, different vegetable shell material is nut shell material.

3. A method as in claim 2 wherein said nut shell material comprises a member of the group consisting of walnut shells and filbert shells.

* * * * *

UNITED STATES PATENT AND TRADEMARK OFFICE
CERTIFICATE OF CORRECTION

PATENT NO. : 4,770,349

DATED : September 13, 1988

INVENTOR(S) : Joseph W. Ayers

It is certified that error appears in the above-identified patent and that said Letters Patent is hereby corrected as shown below:

Column 1, line 45, replace "laninates" by --laminates--;

Column 3, line 20, replace "oter" by --other--;

Column 3, line 55, replace "occurrirg" by --occurring--;

Column 3, line 61, replace "pnematic" by --pneumatic--;

Column 4, line 46, replace "percnnt" by --percent--;

Column 5, line 3, replace "a" by --as--;

Column 5, line 17, after "emulsion" insert a comma (,);

Column 6, line 36, replace "detmerination" by --determination--;

Column 6, line 38, replace "buidling" by --building--;

Column 11, Table 6, Ex. 4, replace "Almond" (first occurrence) by --Filbert--;

Column 11, Table 6, Ex. 9, delete "325 Mesh Filbert 80%" (first occurrence);

Column 11, Table 7, Ex. 4, before "Mesh Filbert", replace "325" by --200--;

Column 12, Table 8, line 60, before "50%" insert --6--;

Column 12, Table 8, line 63, before "20%" insert --7--;

Column 13, line 48, replace "ard" by --and--;

Column 14, line 3, replace "visorsities" by --viscosities--;

Column 15, line 19 replace "AlI" by --All--;
Column 15, line 25 replace "failure's" by --failures--;

UNITED STATES PATENT AND TRADEMARK OFFICE
CERTIFICATE OF CORRECTION

PATENT NO. : 4,770,349

DATED : September 13, 1988

INVENTOR(S) : Joseph W. Ayers

It is certified that error appears in the above-identified patent and that said Letters Patent is hereby corrected as shown below:

Column 17, Claim 1, line 2 (actual count), replace "sheel" by --shell--:

Columns 17 and 18, Claim 1, lines 7 and 8 (actual count), replace "vegatable" by --vegetable--;

Column 18, Claim 1, line 11 (actual count), replace "obtaine" by --obtained--.

Signed and Sealed this

Twenty-fifth Day of February, 1992

Attest:

HARRY F. MANBECK, JR.

*Attesting Officer*   *Commissioner of Patents and Trademarks*